United States Patent Office  3,264,227
Patented August 2, 1966

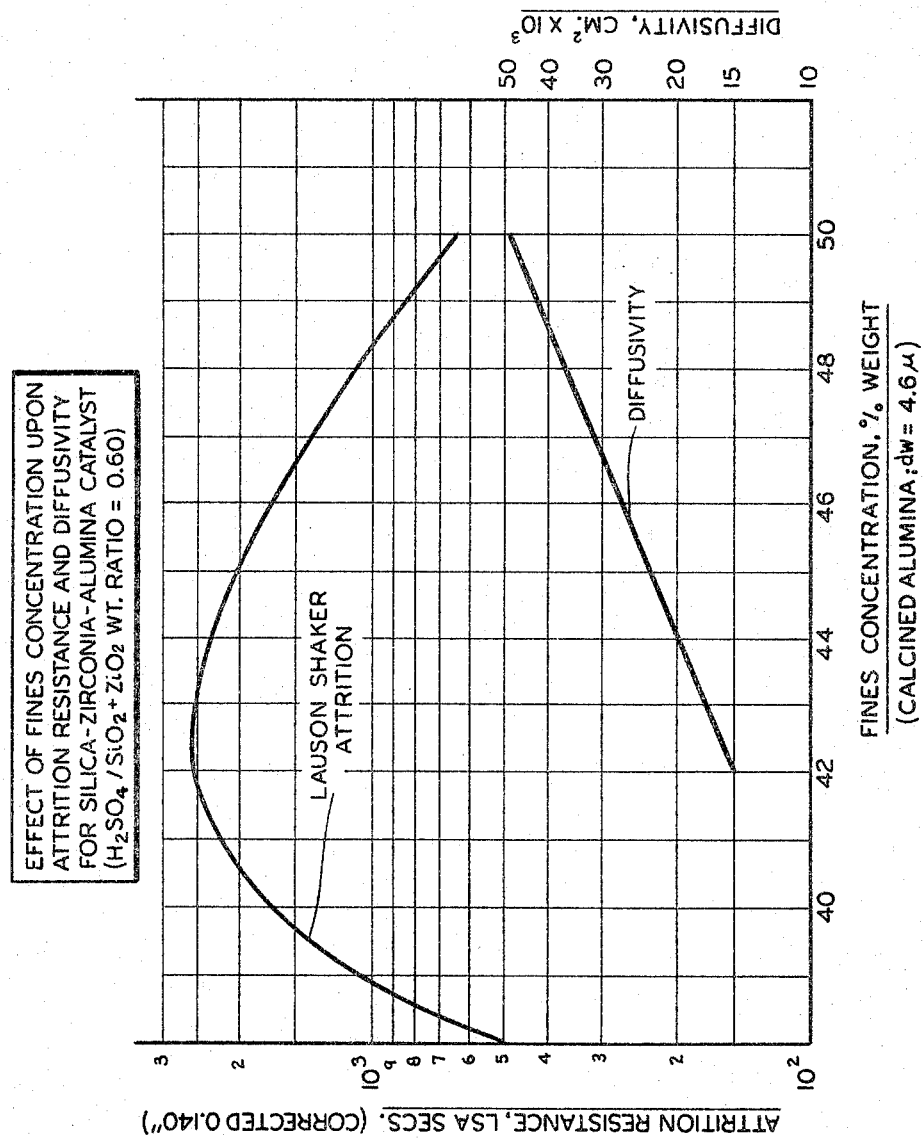

3,264,227
MANUFACTURE OF A SILICA-ZIRCONIA-ALUMINA CATALYST
Robert H. Cramer, Woodbury, and Abbott F. Houser, Delaware Township, Camden County, N.J., assignors to Socony Mobil Oil Company, Inc., a corporation of New York
Filed Mar. 13, 1961, Ser. No. 95,280
13 Claims. (Cl. 252—452)

This invention relates to the preparation of a silica-zirconia-alumina catalyst having improved properties. More particularly, this invention relates to a method for producing a solid porous silica-zirconia-alumina catalyst, which catalyst may be used for the catalytic conversion of hydrocarbon oils into lower boiling normally liquid and normally gaseous products, particularly into gasoline having a higher octane number than that obtained using a silica-zirconia catalyst.

Many operations for the conversion of hydrocarbon materials are carried out in the presence of inorganic oxide gels, which gels exert a catalytic effect upon the hydrocarbons. Such inorganic oxide gels are generally prepared by the formation of a sol of a desired composition, which sol will set to form a hydrogel after a lapse of a suitable period of time. The resulting hydrogel is washed to remove impurities and then dried to remove the liquid phase therefrom. Typical solid porous catalysts of this type include gels of silica, alumina, molybdena, magnesia, chromia, zirconia, thoria, titania, manganese oxide, and the like. Such gels may frequently comprise a cogel of two or more inorganic oxides, for example, silica-alumina, silica-zirconia, silica-alumina-zirconia, silica-alumina-chromia, and the like.

Of the present commercially available cracking catalysts, a synthetic silica-alumina catalyst is by far the most widely used. While such a type of catalyst is in many ways superior to the previously employed clay catalysts and is satisfactory in many respects, it is somewhat lacking in certain attributes that are desirable in a present day catalytic cracking catalyst.

Thus, modern catalytic cracking processes require a catalyst which is not only specifically active in the chemical reactions which are to be catalyzed but also possesses physical characteristics required for commercially successful operation. One of the important physical attributes of a commercial catalyst is hardness, i.e., the ability to resist attrition. The ability of a particle to hold its shape in withstanding the mechanical handling to which it is subjected upon storage, shipment, and use is a primary requirement for a successful cracking catalyst and for modern catalytic processes utilizing such catalyst. Thus, catalytic cracking operations in which heavy petroleum fractions are converted to lighter materials boiling in the range of gasoline are carried out in the presence of a solid porous catalyst and generally a composite of silica-alumina which may contain a minor proportion of one or more added metals or metal oxides. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard porous catalyst having the ability to withstand abrasion during the necessary handling operations during continual conversion and regeneration is therefore highly desirable.

Another important physical attribute of a modern-day cracking catalyst is its diffusivity. The diffusivity of a catalyst is a measured property which characterizes the ability of fluids to diffuse therethrough. A high catalyst diffusivity permits more rapid diffusion of hydrocarbon vapors and other gases throughout the catalyst structure, thereby making possible the use of higher space velocities of hydrocarbons and requiring less time for regeneration of the catalysts when they have become fouled with carbonaceous materials. In present commercial cracking units carbon burning capacity of the regenerator is the primary limiting factor on conversion capacity for the unit and on conversion level per pass. It is accordingly desirable to increase carbon burning capacity by improving the carbon burning rate for the spent catalysts.

One inorganic oxide gel that has received particular attention is silica-alumina into which has been incorporated a certain proportion of fines. These fines are a solid powdered material that is insoluble in the initial hydrogel so that they retain their discrete character in the resultant hydrogel. It has been found that the incorporation of such fines into the oxide gel results in a catalyst having improved attrition resistance and improved hardness. U.S. Patent No. 2,900,349 describes in considerable detail the preparation of such fines-containing catalysts. The addition of high density fines to a catalyst will increase the catalyst density and will also improve the catalyst attrition resistance and diffusivity. The increase in density will permit greater hydrocarbon throughput in moving bed units. The increased attrition resistance will result in lower catalyst makeup rates. Higher diffusivities result in a catalyst having a faster coke burning rate.

In spite of the advantages of such a fines-containing silica-alumina catalyst, it has been found that the use of a suitably activated cracking catalyst of silica-zirconia of the homogeneous type, i.e., not containing fines, provides advantages thereover at the same hydrocarbon conversion level in that higher gasoline yields are obtained. However, the gasoline product obtained by means of such a silica-zirconia catalyst has a lower octane number than that of the gasoline product obtained using a fines-containing silica-alumina catalyst. Because of the increasing requirements for high octane gasoline, such a loss in octane number is highly undesirable, in spite of the yield advantages obtained from the use of such a silica-zirconia catalyst.

Accordingly, it is an object of our invention to provide a novel method for the preparation of a solid porous catalyst of silica-zirconia-alumina.

Another object is to provide a method for the preparation of a silica-zirconia-alumina catalyst, which catalyst maintains virtually the same yield structure as that obtained from the use of a silica-zirconia catalyst, but which at the same time produces a gasoline of higher octane number than that obtained from such a silica-zirconia catalyst.

Yet another object is to provide a novel method for producing silica-zirconia-alumina catalyst having fines incorporated therein and exhibiting improved properties.

Additional objects will become apparent hereinafter.

Our invention will be more fully understood by reference to the accompanying drawing which is a graph showing the effect of fines concentration upon attrition resistance and also upon diffusivity.

In accordance with one aspect of our invention, an improved porous catalyst capable of producing high octane gasoline, this catalyst consisting essentially of silica, zirconia and alumina, is prepared by intimately contacting an aqueous acid zirconium salt solution with an aqueous sodium silicate solution to thereby form a hydrosol having a pH of from 7 to 10, permitting the hydrosol to set to a hydrogel, the two solutions having been contacted in such proportions that the resulting hydrogel contains from about 75 to 99.5 percent by weight silica and from about 0.5 to 25 percent by weight zirconia, these proportions based on the cogelled oxides only, treating the hydrogel with a hot aqueous solution of an aluminum salt to induce base exchange between the aluminum salt and the silica-zirconia hydrogel to form a silica-zirconia-alumina hydrogel, scavenging (e.g., treating with an ammonium salt solution) to remove any residual zeolitic alkali therefrom, water washing the hydrogel free of soluble matter, and drying the hydrogel.

In accordance with another embodiment of our invention, an improved porous catalyst capable of producing high octane gasoline and at the same time exhibiting unusual hardness and attrition resistance, this catalyst consisting essentially of silica, zirconia, alumina, and fines, is prepared in a similar manner as described previously, however, a predetermined proportion of insoluble fines, e.g., alumina fines, are initially incorporated into the sodium silicate solution to form a slurry, so that subsequent addition of the sulfatozirconic acid solution thereto results in the formation of a silica-zirconia hydrogel containing these discrete fines particles as an integral part thereof. The fines-containing hydrogel is then treated as previously described, i.e., base-exchanged with an aluminum salt, further treated to remove zeolitic alkali, washed, and dried.

We have found that by virtue of the particular sequence of procedural steps, that is, first forming a silica-zirconia cogel and then base-exchanging alumina into the cogel to form a three component silica-zirconia-alumina gel, the resultant catalyst exhibits a considerably improved isomerization activity and accordingly will produce higher octane gasoline. Silica-zirconia-alumina cogels formed by simultaneous addition of all three components (rather than by the subsequent base-exchanging to add the alumina) do not show such improved isomerization activity and do not produce gasoline having so high an octane number.

If desired, the initial silica-zirconia hydrogel may, prior to base-exchanging with the aqueous solution of an aluminum salt, be subjected to hydrothermal treatment, i.e., contacted with water at an elevated temperature for a specified period of time. Such treatment affords a convenient means for controlling the density of the finished catalyst. In general, the higher the temperature and the longer the time of treatment, the lower the density of the finished catalyst.

The two initial forming solutions, that is, the sodium silicate solution and the sulfatozirconic acid solution, are mixed in such proportions that they will result in a hydrogel having a silica content of from about 75 to 99.5 percent and a zirconia content of from about 0.5 to 25 percent by weight (based on the cogelled oxides only). The pH during the forming of the hydrogel should be from about 7 to 10. A more preferred pH range is from 8 to 9.

When it is desired to produce a fines-containing catalyst system by the method of our invention, it is preferred that the fines material be of "high density." Further, the fines material must be insoluble in the hydrosol and be infusible at the temperature of calcination of the hydrogel. A high density material as contemplated herein is defined as one wherein the particle density thereof is in excess of 2.5 gms. per cubic centimeter. Particle density is computed on the basis of the total volume of the particle including pores therewithin. It is to be distinguished from "real" or skeletal density which is computed solely on the basis of the actual volume occupied by the catalyst material per se and excludes pore space. Subsequent examples illustrate the use of calcined alumina fines, however other suitable materials that do not adversely affect the catalytic properties include barytes, zircon dead burned clay, bauxite, etc. In general, those fines materials disclosed in U.S. Patent No. 2,900,349 and having particle densities in excess of 3 grams per cubic centimeter are suitable.

Our invention also finds application wherein "lower-density" fines, i.e., fines having a particle density less than about 2.5 grams per cubic centimeter, are incorporated into the catalyst. Typical lower-density fines materials include recycle catalyst fines, uncalcined clay, etc.

The fines are desirably incorporated in the sodium silicate solution to form a sodium silicate slurry. The particle size should be from about 2 to 7 microns, weight mean particle diameter. A more preferred range is from 4 to 6 microns. The optimum fines size and concentration will vary depending upon the particular material used.

The particle size distribution of the fines introduced into the silica-zirconia-alumina hydrogel was determined by sedimentation methods. The weight mean particle diameters were determined by plotting the cumulative percent of fines smaller than a given diameter against particle diameter, dividing the total size range into a number of small fractions and calculating as follows:

$$\text{weight mean diameter} = \frac{\Sigma d_i g_i}{\Sigma g_i}$$

wherein $d_i$ is the mean particle size of the fraction in microns and $g_i$ is the corresponding weight percent material in the fraction.

The effect of fines concentration upon attrition resistance and upon diffusivity is shown in the drawing. There is an optimum value for each physical property. These optimums do not all occur at the same fines concentration. Therefore, the most desirable fines concentration will, of necessity, be a compromise as regards the optimums for the various physical properties. From the drawing it will be noted that the attrition resistance (i.e., Lauson Shaker Attrition, defined hereinafter) increases with increasing fines concentration up to a maximum value at 42 percent fines concentration, and then gradually decreases with increasing fines concentration. In contrast, diffusivity continuously increases with increased fines concentration.

Where fines are incorporated in the silica-zirconia-alumina catalyst, it is essential in order to achieve the desired characteristics of high diffusivity and high resistance to attrition that the particle size of the fines incorporated in the silica-zirconia alumina gel be within the approximate range of 2 to 7 microns in weight mean particle diameter. A more preferred range is from 4 to 6 microns weight mean particle diameter. It is also desirable, in order to achieve the above desired catalyst characteristics, that the amount of fines incorporated into the silica-zirconia-alumina gel be within the approximate range of 20 to 60 percent by weight. A more preferred range is from about 40 to 50 percent by weight.

The aluminum salt solution employed as the reactant for the intermediate silica-zirconia hydrogel may be any of the readily available water soluble normal salts such as, for example, aluminum chloride, aluminum nitrate, aluminum sulfate, and the like. If an acid is contained in such a solution such acid is generally, but not necessarily, characterized by the same acid anion as the aluminum salt employed. Thus, an acidic aluminum salt solution of aluminum sulfate containing sulfuric acid has been found to afford highly satisfactory results in manufacture of the present catalyst.

The alkali metal silicate reactant employed in the preparation of the present catalysts is generally sodium silicate but it is contemplated that other alkali metal silicates such as potassium silicate may, likewise, be used.

The aqueous sulfatozirconic acid solution employed as another of the reactants is conveniently prepared by the addition of appropriate amounts of sulfuric acid and zirconium sulfate to water. Of course, other soluble zirconium salts may be substituted for zirconium sulfate. Such salts include zirconium halides, zirconium nitrates, zirconium carboxylates, and the like. Carboxylates of low molecular weight, e.g. formates and acetates, are particularly suitable. Likewise, acids other than sulfuric, may be employed with particular preference being accorded the mineral acids.

The intermediate hydrogel state, that is, the initial silica-zirconia hydrogel obtained in the course of the preparation of the present catalyst, is to be distinguished from the gelatinous precipitate. True all-embracing hydrogels occupy the entire volume of the solution from which they are formed and possess a definitely rigid structure. When fractured, a true hydrogel shows a conchoidal fracture as compared to an irregular ragged edge fracture as obtained in the case of gelatinous precipitates. The latter occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that due to their rigid structure, they can be formed into high quality spheroidal particles.

If desired, the silica-zirconia hydrogel resulting from the mixing of the sodium silicate and sulfatozirconic acid forming solutions, particularly if it contains finely divided fines dispersed therein may be subjected to a hydrothermal treatment which involves contacting the hydrogel with water at an elevated temperature for a specified period of time. This permits a ready control of the final density of the catalyst.

The silica-zirconia hydrogel is then activated or base-exchanged by treatment with an aqueous aluminum salt solution, e.g. a solution of aluminum sulfate, this solution maintained at a temperature of from about 125° F. to 200° F. A more preferred temperature range is from 150° F. to 200° F. This solution may contain both an aluminum salt and an acid or the acid may be absent therefrom. If the solution consists of an aqueous aluminum salt such as aluminum sulfate, it desirably contains from 0.5 to 10 percent aluminum sulfate and from 90 to 99.5 percent water. A more preferred range is from 1 to 5 percent aluminum sulfate and from 95 to 99 percent water. If an aqueous solution of both acid and an aluminum salt is used, the preferred ranges are from 0.5 to 2.5 percent salt, from 0.5 to 2.5 percent acid, and from 95 to 99 percent water.

The time required for the base-exchange treatment of the hydrogel with the hot solution may vary within considerable limits, i.e., from as little as one hour up to 24 hours. We prefer a time of the order of from about 5 to 12 hours.

The amount of alumina that will be contained in the finished catalyst as gel will, of course, be dependent upon a number of factors such as the concentration of the aluminum salt solution, the ratio of the volume of aluminum salt solution to the volume of hydrogel, the contact time, the temperature, etc.

The hot activation of the hydrogel is a critical step in the successful practice of the invention. Not only does this step introduce alumina into the silica-zirconia cogel by base-exchange, but in addition, if this step is omitted, the finished catalyst fails to exhibit the desired attributes obtainable when such step is included. For example, without such hot activation the resulting catalyst does not produce the enhanced gasoline yield obtained in the practice of the present invention.

After activation with a suitable aluminum salt, the hydrogel is scavenged with a suitable aqueous solution to remove any zeolitic sodium introduced into the hydrogel from the sodium silicate solution and not removed by hot activation. The hydrogel may be scavenged with a suitable aqueous solution containing an ion capable of replacing zeolitic alkali metal, which ion does not detrimentally affect the finished catalyst. Thus, the scavenge solution employed may effect replacement of zeolitic alkali metal without involving the introduction of an additional metal or metal compound in the hydrogel, such as treatment with a solution of an aluminum salt, an ammonium salt or an acid. By using a scavenge solution of a metal salt other than a metal already contained in the hydrogel, it is possible to introduce quantities of an additional metal oxide into the gel composite. The incorporation of such additional oxide into the hydrogel may desirably act as a catalytic promoter under particular reaction conditions.

The scavenge may be carried out at room temperature or at temperatures up to about 200° F. An aqueous solution of ammonium sulfate is a particularly suitable scavenge solution. Such a solution should contain from about 0.05 to 1.0 weight percent of ammonium sulfate. The duration of the scavenge treatment may vary within wide limits, that is, from as little as 0.5 up to 36 hours. More preferably, the duration should be from about 0.5 up to 24 hours.

While as described herein the hot activation step and the scavenge step are carried out successively, if desired these two steps can be combined into a single operation. In commercial production such a combination offers obvious economical advantages.

The hydrogel product after scavenge is water washed free of soluble matter. The washed hydrogel is then dried, suitably in an atmosphere of superheated steam, at a temperature of about 150° F. to about 400° F. The dried product is thereafter calcined for from 1 to 24 hours, suitably in an atmosphere of air and/or steam, at a temperature of from about 1100° F. to 1600° F. to yield an attrition resistant finished catalyst capable of producing high octane gasoline. A more preferred calcination temperature is from about 1200° F. to 1450° F.

Where it is desired to incorporate fines into the catalyst, finely divided calcined alpha alumina may desirably be employed as a fines material. It is composed of alpha alumina which has undergone calcination at a temperature in excess of 2000° F. such that the surface area normally present at low temperature is largely destroyed. Alcoa A–2 Alumina has been found to be a very effective form of alumina. A–2 Alumina is characterized by a hexagonal crystalline structure and has the following properties:

Chemical analysis, percent:
    $Al_2O_3$ _____ 99
    $Na_2O$ _____ 0.50
    $Fe_2O_3$ _____ 0.04
    $SiO_2$ _____ 0.025
    Loss on ignition 1100° C. _____ 0.30
    Water adbsorbed at 50% humidity _____ 0.10
    Alpha alumina content, percent _____ 90+
Physical properties:
    Bulk density, packed, lb./ft.$^3$ _____ 68
    Bulk density, loose lb./ft.$^3$ _____ 52
    Specific Gravity _____ 3.7–3.9
    Surface area, m.$^2$/g. _____ 0.4
    Pore volume, ml./g. _____ 0.25
    Pore diameter, A° _____ 15,000

The process described herein may be employed in the preparation of a silica-zirconia-alumina cracking catalyst in any desired physical form. Thus, the hydrosol may be permitted to set in mass to a hydrogel which is thereafter dried and broken into pieces of desired size. The pieces of gel so obtained are generally of irregular shape. Uniformly shaped pieces of gel may be obtained by extrusion or pelleting of the powder-containing hydrogel. Also the hydrosol may be introduced into the perforation of a perforated plate and retained therein until the sol has set to a hydrogel after which the formed hydrogel pieces are removed from the plate. The method of the invention is especially useful as applied to the manufacture of spherically shaped gel particles produced by any feasible process such as that described in patents to Marisic, for example, U.S. 2,384,946. Broadly, such methods involve introducing hydrosol in to a column of water-immiscible liquid, for example, an oil medium wherein globules of hydrosol are formed and set to spheroidal bead-like particles of hydrogel. Larger size spheres are ordinarily within the range of from about 1/64 to about 1/2 inch in diameter whereas smaller size spheres which are generally referred to as microspheres are within the range of from about 10 to about 100 microns in diameter. The use of spherically shaped gel particles is of particular advantage in hydrocarbon conversion processes including the moving catalyst bed process, the fluidized process and other processes in which the spheroidal silica-zirconia-alumina cracking catalyst particles are subject to continuous movement. As applied to the stationary bed spheroidal gel catalyst particles provided effective contact between the reactants and the catalyst by avoiding channeling.

It is accordingly one embodiment of the present invention to prepare the described attrition-resistant silica-zirconia-alumina catalyst in the form of spheres although it is to be realized that the method hereinafter set forth may also be employed in obtaining a mass of gel which may thereafter be broken up into particles of desired size. Likewise, the method described herein may be used in the preparation of silica-zirconia-alumina cracking catalysts in the form of particles of any other desired size or shape.

Steam stability of the catalyst prepared in accordance with the method described herein was determined by an accelerated test which similates the conditions encountered during catalyst use. In this test, the catalyst is contacted with 100 percent steam at 1200° F. and 15 p.s.i.g. pressure for 30 hours and the cracking activity is then determined and compared with the cracking activity of fresh, unsteamed catalyst. The results thus obtained are indicative of the stability of the catalyst.

The cracking activity of the catalyst is a measure of its capacity to catalyze conversion of hydrocarbons and is expressed herein as the percentage conversion of a Mid-Continent Gas Oil having a boiling range of 450° F. to 950° F. to gasoline having an end point of 410° F. by passing vapors of the said gas oil through the catalyst at 875° F., substantially atmospheric pressure and a feed rate of 1.5 volumes of liquid oil per volume of catalyst per hour for ten minute runs between regenerations. The catalyst described herein is desirably characterized by a conversion, at equilibrium, determined on the above basis within the approximate range of 40 to 50.

The diffusivity of the catalyst is a measure of the ability of fluids to diffuse therethrough and is determined by measuring the rate at which hydrogen under a constant partial pressure, at essentially atmospheric conditons, will pass through a single catalyst particle having a size of 5 to 6 mesh (Tyler). The diffusivity is the average of such determinations on fifteen particles and is expressed as cubic centimeters of hydrogen per centimeter of catalyst per second $\times 10^{-3}$. The catalyst described herein is desirably characterized by a diffusivity determined on the above basis of at least 10 and generally within the range of 15 to 30.

The term "apparent density" as utilized herein refers to the weight as compared with the volume occupied by a packed mass of the catalyst particles. It is determined by weighing a fairly large volume of the catalyst particles. For example, a large diameter graduated cylinder is filled to a volume calibration, gently tamped down, and the weight of the particles determined by difference in weight of the graduate before and after filling with the particles.

The catalyst of the present invention in one embodiment, i.e. when containing fines of high density as described hereinabove, is characterized by an apparent density of at least 0.9 gram per cubic centimeter.

The attrition characteristics of the catalysts prepared in accordance with the method described herein were determined by an attrition test known as the Lauson Shaker Attrition (LSA) Test. The procedure used in the test consists of shaking a 50 cc. sample of the product to be tested in a closed steel cup which is bolted to the piston of a motor-drive Lauson Engine which operates at 1000 r.p.m. After shaking for a time sufficient to produce 10 weight percent fines, capable of passing through an 8 mesh (Tyler) screen, the sample is screened, weighed and the percentage loss is calculated. These operations are repeated until slightly more than half of the sample has been reduced to fines. Cumulative losses are plotted against total shaking time. The cumulative time in seconds for 50 percent weight of fines is read from the curve and is reported as the Lauson Shaker Attrition. Since the LSA of gels is affected by the size of the particles tested, the attrition data reported herein correspond to those of particles having an average particle diameter of 0.140 inch to avoid the interferences of these variables in correlating the effect of quantity and size of added material on attrition. The catalyst described herein is characterized by a LSA attrition resistance of at least 1000 seconds.

In accordance with a further aspect of our invention, we have found that by increasing the total sulfate ion content (expressed as $H_2SO_4$ in Table 1) in the sulfatozirconic acid solution, the whole bead count is considerably increased. This is clearly shown by Table 1, wherein weight ratios of sulfuric acid to silica plus zirconia of 0.61 and 0.37 resulted in whole bead counts of 89 percent and 17 percent, respectively. We prefer that the ratio of sulfuric acid to silica and zirconia in the freshly formed hydrogel be from about 0.35 to 0.75. A still more preferred range is from about 0.55 to 0.65.

TABLE 1

[Effect of $H_2SO_4/(ZrO_2+SiO_2)$ weight ratio on whole bead Counts]

| Forming Conditions: | | |
|---|---|---|
| Composition (As Formed): | | |
| $SiO_2$, Wt | 51.2 | 53.3 |
| $ZrO_2$, Wt | 6.8 | 5.8 |
| Fines, Percent Wt | 42.0 | 40.9 |
| Product Concentration: | | |
| Gel Phase, Percent Wt | 10.9 | 10.9 |
| Gel + Fines, Percent Wt | 18.8 | 21.3 |
| Forming pH | 8.5 | 8.5 |
| Gel Time, Sec | 3.8 | 3.1 |
| Temperature, °F | 66 | 55 |
| $H_2SO_4/(SiO_2+ZrO_2)$, Wt. Ratio | 0.61 | 0.37 |
| Forming Solutions: | | |
| Sulfatozirconic Acid solution: | | |
| $H_2O$, Percent Wt | 83.91 | 89.80 |
| $ZrO_2$, Percent Wt | 2.52 | 2.25 |
| $H_2SO_4$, Percent Wt | 13.57 | 7.95 |
| Specific Gravity at 60° F | 1.121 | 1.080 |
| Flow Rate, cc./min | 355 | 390 |
| Silicate Solution: | | |
| $H_2O$, Percent Wt | 37.69 | 36.06 |
| N Brand Silicate, Percent Wt | 47.80 | 52.22 |
| NaOH, Percent Wt | 3.28 | |
| Fines (Alpha Alumina, A-2), Percent Wt | 11.23 | 11.72 |
| Specific Gravity at 60° F | 1.338 | 1.308 |
| Flow Rate, cc./min | 425 | 415 |
| Hot Alum Treat: | | |
| $Al_2(SO_4)_3$, Percent Wt | 3 | 3 |
| Pounds Sol'n./gal. beads | 4 | 4 |
| Hr. - Temp., °F | 8-200 | 8-200 |
| Physical Properties: | | |
| Whole Bead Count, Percent Wt | 89 | 17 |
| Apparent Density, gms./cc.: | | |
| Calcined | 0.91 | 0.88 |
| Steamed | 0.95 | 0.94 |
| Diffusivity, cm.²/sec.$\times 10^3$ | 23 | 25 |

The finished catalyst composition may vary within considerable limits. If a fines-containing catalyst is prepared, the amount of fines present may be up to 60 weight percent. A more preferred range is from 40 to 50 percent fines and from 50 to 60 percent gel phase. The gel phase itself may contain from 0.5 to 25 percent zirconia, from 0.5 to 5 percent alumina, and from 70 to 99 percent silica. A more preferred range is from 5 to 15 percent zirconia, from 1 to 4 percent alumina, and from 81 to 94 percent silica.

Table 2 shows that the forming pH does affect the catalyst activity. It will be noted that the optimum forming pH is about 8.5, for at this level the combination of catalyst conversion and yields is optimum.

It should also be noted that in order to maintain the desired proportions of zirconia and silica in the hydrogel, and form, at the desired pH of 8.5, it is desirable to add sodium hydroxide to the fines-silicate slurry. This is shown by a comparison of columns 1 and 2 of Table 1.

The process of our invention is not limited to the specific silica-zirconia-alumina system primarily described. Thus, salts of other polyvalent metals than aluminum may be substituted to prepare silica-zirconia-third component catalysts. For example, chromia, molybdena, or titania might be substituted for alumina as third component.

The silica-zirconia-alumina catalysts produced by the method of our invention may, if desired, also contain other components. For example, the controlled addition of chromia may be effected if it is desired to increase the coke burning rate of the catalyst. Such addition would also serve to prevent afterburning, and yet would not adversely affect the cracking properties of the catalyst.

TABLE 2.—FINES-CONTAINING SILICA-ZIRCONIA-ALUMINA
[Effects of forming pH on catalyst yield structure]

| | | | |
|---|---|---|---|
| Composition: | | | |
| $SiO_2$, percent Wt | 50.4 | 50.1 | 50.4 |
| $ZrO_2$, percent Wt | 6.6 | 6.4 | 5.9 |
| $Al_2O_3$, percent Wt | 2.4 | 2.6 | 2.8 |
| Calcined $Al_2O_3$, percent Wt | 40.6 | 40.9 | 40.9 |
| Forming pH | 6.9 | 8.5 | 10.0 |
| Hot Water Treat: | | | |
| Hours | 4 | 4 | 4 |
| Temperature, °F | 85 | 85 | 85 |
| Hot Activation Treat: | | | |
| Hours | 8 | 8 | 8 |
| Temperature, °F | 200 | 200 | 200 |
| $Al_2(SO_4)_3$, percent Wt | 3 | 3 | 3 |
| Solution (#/gal.) | 4 | 4 | 4 |
| Gel pH After Hot Acid Treat | 2.7 | 3.5 | 3.7 |
| Scavenge: 12 1-hr. Treatments, 0.1% $(NH_4)_2(SO_4)$ | Yes | Yes | Yes |
| Drying (Steam), °F | 250-300 | 250-300 | 250-300 |
| Air Temper, Hrs.-°F | 5-1,400 | 5-1,400 | 5-1,400 |
| Steam Treat, Hrs.-°F-p.s.i.g | 10-1,200-15 | 10-1,200-15 | 10-1,200-15 |
| Physical Properties: | | | |
| Whole Beads, percent Wt | 98 | 17 | 2 |
| Apparent Density: | | | |
| Calcined | 0.89 | 0.88 | 0.67 |
| Steamed | 0.95 | 0.94 | 0.71 |
| A.P.D., in LSA (50% wgt. loss), secs. (crtd. to 0.140" APD) Estimated from 1,000" test. | | | |
| Catalyst Yield: | $\Delta^1$ | $\Delta^1$ | $\Delta^1$ |
| Conversion, Percent vol | 46.8 | 52.7 | 44.2 |
| Gasoline, Percent vol | 36.9+3.6 | 39.7+3.5 | 34.7+2.7 |
| Total $C_4$'s, Percent vol | 11.7−2.8 | 15.3−1.7 | 12.5−0.9 |
| Dry Gas, percent Wt | 4.8−1.1 | 5.9−1.0 | 4.0−1.6 |
| Coke, percent Wt | 2.2−0.6 | 2.5−1.1 | 1.8−0.8 |
| Hydrogen, percent Wt | 0.03−0.01 | 0.04−0.02 | 0.03−0.0 |

[1] $\Delta$ Yield = Experimental Yield less $SiO_2$-$Al_2O_3$ Yield at Same Catalyst Conversion Level.

Our silica-zirconia-alumina catalysts also may be used as a support for an additional metal, metal oxide, or sulfide. For example, such a catalyst system is a very good support for such metals as platinum, palladium, and rubidium, as well as for oxides and sulfides of such metals as cobalt, molybdenum, tungsten and nickel. Such supported catalysts find application in hydrocracking, reforming and the like.

Further, our type of silica-zirconia-alumina catalyst serves as a good support for an oxidation catalyst such as, e.g., oxides of chromium, nickel, iron, copper, vanadium, manganese, platinum, or the like.

The following examples will further illustrate our invention. All parts are by weight unless otherwise indicated.

*Example 1*

This example illustrates the use of the method of our invention to prepare a "homogeneous" type of catalyst, that is, a silica-zirconia-alumina catalyst containing no fines. A silica-zirconia-alumina gel was prepared by mixing streams comprising (1) an aqueous sulfatozirconic acid solution and (2) an aqueous sodium silicate solution. The aqueous zirconium sulfate solution was 88.98 percent water, 2.37 percent zirconia, and 8.65 percent sulfuric acid. This solution had a Specific Gravity at 60° F. of 1.083 and a solution rate of 375 cubic centimeters per minute. The sodium silicate solution consisted of 60 percent sodium silicate (N-Brand) and 40 percent water. This solution had a Specific Gravity at 75° F. of 1.213 and a solution rate of 415 cubic centimeters per minute.

These two streams were brought together in such proportions that the resulting pH was 8.5. There resulted a hydrogel. The gel time was 2.8 seconds at a temperature of 52° F. The hydrogel was then base-exchanged by treatment with an aqueous acid alum solution consisting of 2.25 percent aluminum sulfate, 0.75 percent sulfuric acid, and 97 percent water. This treatment was continued for eight hours. The acid alum solution was kept at a temperature of 200° F. The resultant base exchange between the original silica-zirconia hydrogel and the aluminum sulfate thereby forms a hydrogel of silica-zirconia-alumina.

The hydrogel was then treated with an aqueous solutions of 0.1 percent ammonium sulfate for twelve one-hour exchanges at room temperature, to thereby scavenge the hydrogel and remove any remaining zeolitic alkali therefrom. The hydrogel was then water washed, dried, and then subjected for five hours to calcination at a temperature of 1400° F. and an air rate of 3 volumes of air per volume of catalyst per minute (3 v./v./min.) to thereby dry the hydrogel. The resulting catalyst had an apparent density of 0.68 gram per cubic centimeter.

The finished silica-zirconia-alumina catalyst consisted of 88.8 percent silica, 8.8 percent zirconia, and 2.4 percent alumina (Table 3). The resultant yield and product distribution obtained at 57.9 percent conversion by using this catalyst, a comparison with the yield and product distribution obtained using a control, namely, a homogeneous silica-zirconia catalyst made in the same manner, but without the base-exchange treatment with aluminum sulfate, and a further comparison (shown as $\Delta$ yields) with the yield and product distribution obtained at the same conversion using a 90% silica-10% alumina catalyst is given in Table 3. It will be noted that the octane number of the gasoline produced by using the homogeneous silica-zirconia-alumina catalyst made by the method of our invention was 97.6, or 0.9 higher than the 96.7 octane numbered gasoline obtained from the silica-zirconia catalyst. Thus, while both of these catalysts present similar yield distribution, which product distribution is clearly superior to that obtained from a silica-alumina catalyst, the latter catalyst does no provide the high octane gasoline obtainable by the former.

*Examples 2–3*

The procedure of Example 1 was repeated, however, the proportions of the acid alum solution were varied as shown in Table 3. Thus, in Example 2 the solution consisted of 1.5 percent aluminum sulfate, 1.5 percent sulfuric acid, and 97 percent water, whereas in Example 3, its composition was 0.75 percent aluminum sulfate, 2.25 percent sulfuric acid, and 97 percent water. The catalyst properties, compositions, and yields obtained therefrom are shown in Table 3. It will be evident that the silica-zirconia-alumina catalysts so produced offer the same advantages as described in Example 1.

*Examples 4–7*

These examples illustrate the applicability of the method of our invention to the production of silica-zirconia-alumina catalysts having fines incorporated therein. The procedure was similar to that described in Example 1, however in each instance the sodium silicate forming solution contained a predetermined quantity of alumina fines, as indicated in Table 3. Variations were also made in the proportions of the base-exchange solution of aluminum sulfate. The proportions of the final silica-zirconia-alumina catalysts and the yields obtained therefrom are shown in Table 3. These yields are compared with the yields obtained using a fines-containing silica-zirconia catalyst made in the same manner, but without base-exchange treatment with aluminum sulfate, and also with the yields obtained using a 90% silica-10% alumina catalyst. Considering and comparing the results of the catalyst of Example 4 and the results of the fines-containing

TABLE 3

[Physical and Chemical Properties of $SiO_2$-$ZrO_2$-$Al_2O_3$ Catalysts]

| | Homogeneous Catalysts | | | | Fines-Containing Catalysts | | | | |
|---|---|---|---|---|---|---|---|---|---|
| | $SiO_2$-$ZrO_2$ | $SiO_2$-$ZrO_2$-$Al_2O_3$ | | | $SiO_2$-$ZrO_2$ | $SiO_2$-$ZrO_2$-$Al_2O_3$ | | | |
| | Acid Treat | $Al_2O_3$ by base Exchange | | | Acid Treat | $Al_2O_3$ by Base Exchange | | | |
| | Control | Ex. 1 | Ex. 2 | Ex. 3 | Control | Ex. 4 | Ex. 5 | Ex. 6 | Ex. 7 |
| Forming: | | | | | | | | | |
| pH | 8.4 | 8.5 | 8.5 | 8.5 | 8.4 | 8.5 | 8.5 | 8.5 | 8.5 |
| Zirconium Sulfate Solution: | | | | | | | | | |
|   $H_2O$, percent wt | 89.21 | 88.98 | 88.98 | 88.98 | 88.48 | 89.19 | 89.58 | 89.19 | 89.58 |
|   $ZrO_2$, percent wt | 2.49 | 2.37 | 2.37 | 2.37 | 2.83 | 3.29 | 2.47 | 3.29 | 2.47 |
|   $H_2SO_4$, percent wt | 8.30 | 8.65 | 8.65 | 8.65 | 8.69 | 7.52 | 7.95 | 7.52 | 7.95 |
|   Sp. Gr. at 60° F | 1.081 | 1.083 | 1.083 | 1.083 | 1.084 | 1.081 | 1.080 | 1.081 | 1.080 |
|   Solution Rate, cc./min | 379 | 375 | 375 | +375 | 347 | 402 | 390 | 420 | 390 |
| Silicate Solution: | | | | | | | | | |
|   N-Brand, percent wt | 60 | 60 | 60 | 60 | 53.03 | 51.26 | 52.22 | 51.26 | 52.22 |
|   Fines, percent wt | | | | | 11.34 | 12.06 | 11.72 | 12.06 | 11.72 |
|   $H_2O$, percent wt | 40 | 40 | 40 | 40 | 35.63 | 36.68 | 36.06 | 36.68 | 36.06 |
|   Sp. Gr. at 75° F | 1.212 | 1.213 | 1.213 | 1.213 | 1.308 | 1.308 | 1.306 | 1.308 | 1.306 |
|   Solution Rate, cc./min | 400 | 415 | 415 | 415 | 397 | 415 | 415 | 415 | 415 |
|   Type Fines | | | | | Alumina | Alumina | Alumina | Alumina | Alumina |
|   Fines Size, Microns, dw/ds | | | | | 4.8/3.4 | 4.8/3.4 | 4.8/3.4 | 4.8/3.4 | 4.8/3.4 |
| Gel Time, sec./Temp.,° F | 2.6/50 | 2.8/52 | 2.8/52 | 2.8/52 | 3.0/52 | 2.0/60 | 3.2/55 | 2.0/60 | 3.2/55 |
| Hydrogel Processing: | | | | | | | | | |
|   Hot Water Treat, Hrs./Temp.,° F | | | | | 4/100 | | | | |
| Activation: | | | | | | | | | |
|   $Al_2(SO_4)_3$, percent wt | | 2.25 | 1.5 | 0.75 | | 3.0 | 3.0 | 2.25 | 2.25 |
|   $H_2SO_4$, percent wt | 2 | 0.75 | 1.5 | 2.25 | 3.0 | | | 0.75 | 0.75 |
|   No. Batches | 1 | 1 | 1 | 1 | 1 | 1 | 1 | 1 | 1 |
|   Hrs./Batch | 24 | 8 | 8 | 8 | 3 | 8 | 8 | 8 | 8 |
|   Temp.,° F | 200 | 200 | 200 | 200 | 200 | 200 | 200 | 200 | 200 |
| Scavenge: | | | | | | | | | |
|   $(NH_4)_2SO_4$, percent wt | 2 | 0.1 | 0.1 | 0.1 | | 0.1 | 0.1 | 0.1 | 0.1 |
|   No. Batches | 8 | 12 | 12 | 12 | | 12 | 12 | 12 | 12 |
|   Hrs./Batch | 2 | 1 | 1 | 1 | | 1 | 1 | 1 | 1 |
|   Temp.,° F | Rm. Temp. | Rm. Temp. | Rm. Temp. | Rm. Temp. | Rm. Temp. | Rm. Temp. | Rm. Temp. | Rm. Temp. | Rm. Temp. |
| Calcination: | | | | | | | | | |
|   Time, Hrs | 5 | 5 | 5 | 5 | 5 | 5 | 5 | 5 | 5 |
|   Temp.,° | 1,400 | 1,400 | 1,400 | 1,400 | 1,400 | 1,400 | 1,400 | 1,400 | 1,400 |
|   Air Rate, v./v./min | 3 | 3 | 3 | 3 | 3 | 3 | 3 | 3 | 3 |
| Properties After Tempering: | | | | | | | | | |
|   Apparent Density, g./cc | 0.76 | 0.68 | 0.72 | 0.76 | 0.88 | 0.83 | 0.88 | 0.88 | 0.93 |
|   Avg. Part. Dia., in. [4–7 Mesh Tyler] | | | | | 0.154 | | | | |
| LSA 50% Corr. To. 0.140 APD | | | | | 4,700 | | | | |
| Diffusivity (cm.²/Sec.)×10³ | | | | | 12.7 | 65.4 | 25.0 | 66.4 | 28.0 |
| Catalyst Treatment: | | | | | | | | | |
|   Time, Hrs | 10 | 10 | 10 | 10 | 10 | 10 | 10 | 10 | 10 |
|   Temperature | 1,200 | 1,200 | 1,200 | 1,200 | 1,200 | 1,200 | 1,200 | 1,200 | 1,200 |
|   Percent Steam | 100 | 100 | 100 | 100 | 100 | 100 | 100 | 100 | 100 |
|   Pressure, p.s.i.g. | 15 | 15 | 15 | 15 | 15 | 15 | 15 | 15 | 15 |
| Physical Properties: | | | | | | | | | |
|   Apparent Density, gm./cc | 0.85 | 0.74 | 0.81 | 0.86 | 0.92 | 0.88 | 0.94 | 0.91 | 0.98 |
|   Surface Area m.²/gm | 292 | 235 | 248 | 270 | 206 | | | | |
| Composition: | | | | | | | | | |
|   Finished Catalyst: | | | | | | | | | |
|     $ZrO_2$, percent wt | 10.8 | 8.8 | 8.8 | 11.0 | 6.51 | 7.6 | 5.4 | 7.6 | 5.4 |
|     $Al_2O_3$, percent wt | | 2.4 | 1.3 | 0.5 | | 1.8 | 1.8 | 1.4 | 1.4 |
|     $SiO_2$, percent wt | 89.2 | 88.8 | 89.9 | 88.5 | 53.5 | 49.8 | 51.9 | 50.2 | 52.3 |
|   Calcined $Al_2O_3$ Fines, percent wt | | | | | 40.0 | 40.8 | 40.9 | 40.8 | 40.9 |
| Gas Oil Cracking Yields: | | | | | | | | | |
|   Conversion, percent Vol | 56.6 | 57.9 | 57.5 | 55.8 | 44.6 | 55.6 | 52.5 | 52.4 | 50.7 |
| | Δ[1] | Δ[1] | Δ[1] | Δ[1] | Δ[1] | Δ[1] | Δ[1] | Δ[1] | Δ[1] |
|   Gasoline ($C_4$-free), percent Vol | 42.8+5.1 | 42.7+4.3 | 43.9+5.6 | 40.7+3.2 | 36.0+3.8 | 40.9+3.5 | 39.7+3.5 | 40.3+4.2 | 39.6+4.1 |
|   Total $C_4$'s, percent Vol | 15.0−2.5 | 17.3−1.9 | 16.1−3.0 | 14.1−4.0 | 10.2−3.4 | 16.5−1.7 | 15.3−1.7 | 14.5−2.4 | 13.9−1.6 |
|   Dry Gas, percent wt | 6.3−1.2 | 63.−1.5 | 6.0−1.7 | 7.5+0.2 | 4.4−1.1 | 6.3−1.1 | 5.9−1.0 | 5.5−1.3 | 5.3−1.0 |
|   Coke, percent wt | 3.3−1.0 | 3.1−1.2 | 3.0−1.3 | 3.3−0.7 | 2.5−0.1 | 2.8−1.2 | 2.5−1.1 | 2.5−1.1 | 2.2−0.9 |
|   Hydrogen, percent wt | 0.04−0.01 | 0.02−0.05 | 0.02−0.05 | 0.04−0.02 | 0.08+0.04 | 0.05−0.01 | 0.04−0.02 | 0.04−0.02 | 0.04−0.01 |
|   Octane Number | 96.7 | 97.6 | | | | | | | |

[1] Δ Yield=Catalyst Gas Oil Cracking Yield less $SiO_2$-$Al_2O_3$ Catalyst (90% $SiO_2$-10% $Al_2O_3$) Yield at same conversion level.

silica-zirconia catalyst (Table 3), it will be noted that the presence of alumina in the gel phase raised the catalyst activity to a conversion of 55.6 percent, as compared to a 44.6 percent conversion for the fines-containing silica-zirconia catalyst not containing an alumina gel phase. As compared to the conversions obtained using the homogeneous catalysts of Examples 1–3 and the homogeneous silica-zirconia catalyst, the conversions obtained by using the fines-containing catalysts of Examples 4–7 and the fines-containing silica-zirconia catalyst were somewhat lower, i.e., the alumina fines functioned as a diluent and reduced the conversion level. However, nearly the same yield advantages over silica-alumina were maintained as those obtained from the homogeneous gels of Examples 1–3 and the homogeneous silica-zirconia gel.

Variations can, of course, be made without departing from the spirit of this invention.

Having thus described our invention, what we desire to secure and claim by Letters Patent is:

1. A method of preparing a solid porous catalyst of silica-zirconia-alumina which comprises intimately contacting an aqueous acidic solution of a zirconium salt with an aqueous alkali metal silicate solution to form a hydrosol having a pH of from about 7 to 10 which subsequently sets to a hydrogel containing from 0.5 to 25 percent zirconia and from 75 to 99.5 percent silica based on cogelled oxides only, permitting said hydrosol to set to said hydrogel, treating said hydrogel for from about 1 to 24 hours with a hot aqueous solution of an aluminum salt at a temperature of from about 125 to 200° F. to induce base exchange between said aluminum salt and said hydrogel and form a silica-zirconia-alumina hydrogel containing, on a dry basis, from about 0.5 to 5 percent alumina, washing said hydrogel free of water-soluble material, drying and calcining.

2. The method of claim 1 wherein after said treatment with a hot aqueous solution of an aluminum salt and prior to said washing, said hydrogel is scavenged for from about one half to 36 hours with an aqueous solution containing from about 0.05 to 1 percent by weight of an ammonium salt to induce base exchange and thereby remove any remaining zeolitic alkali therefrom.

3. The method of claim 1 wherein said aqueous solution of an aluminum salt consists of from about 0.5 to 10 percent aluminum salt and from about 90 to 99.5 percent water.

4. The method of claim 1 wherein said aqueous solution of an aluminum salt consists of from about 0.5 to 2.5 percent aluminum salt, from 0.5 to 2.5 percent of a mineral acid, and from 95 to 99 percent water.

5. The method of claim 3 wherein the aluminum salt is aluminum sulfate.

6. The method of claim 4 wherein the aluminum salt is aluminum sulfate and wherein the mineral acid is sulfuric acid.

7. The method of claim 1 wherein said catalyst of silica-zirconia-alumina is characterized by a high diffusivity and an apparent density of at least 0.9 gram per cubic centimeter and said alkali metal silicate solution contains a predetermined amount of powdered material insoluble in either said silicate solution or in said aqueous acidic solution of zirconium salt and is infusible at the temperature of calcination of said hydrogel, said powdered material having a weight mean particle diameter of from about 2 to 7 microns and being present in such quantity as to make up from 20 to 60 percent of said finished catalyst.

8. The method of claim 7 wherein said powdered material has a particle density in excess of 2.5 grams per cubic centimeter.

9. A method of preparing a solid porous catalyst of silica-zirconia-alumina, which comprises intimately contacting an aqueous solution of a zirconium salt and sulfuric acid with an aqueous alkali metal silicate solution in such proportions as to form a hydrosol having a pH of from about 7 to 10 and to subsequently set to a hydrogel containing from 0.5 to 25 percent zirconia and from 75 to 99.5 percent silica based on cogelled oxides only, the weight ratio of sulfuric acid to silica and zirconia in the said hydrogel being from about 0.35 to 0.75, permitting said hydrosol to set to said hydrogel, treating said hydrogel for from about 1 to 24 hours with a hot aqueous solution of aluminum salt at a temperature of from about 125 to 200° F. to induce base exchange between said aluminum salt and said hydrogel to form a silica-zirconia-alumina hydrogel containing, on a dry basis, from about 0.5 to 5 percent alumina, washing said hydrogel free of water-soluble material, drying and calcining.

10. The method of claim 9 wherein after said treatment with a hot aqueous solution of an aluminum salt and prior to said washing said hydrogel is scavenged for from about one half to 36 hours with an aqueous solution containing from about 0.05 to 1 percent by weight of an ammonium salt to induce base exchange and thereby remove any remaining zeolitic alkali therefrom.

11. The method of claim 9 wherein said alkali metal silicate solution contains a predetermined amount of powdered material insoluble in either said silicate solution or in said aqueous solution of zirconium salt and sulfuric acid and is infusible at the temperature of calcination of said hydrogel, said powdered material having a weight mean particle diameter of from about 2 to 7 microns and being present in such quantity as to make up from 20 to 60 percent of said finished catalyst.

12. The method of claim 11 wherein said powdered material has a particle density in excess of 2.5 grams per cubic centimeter.

13. The method of claim 9 wherein said aqueous alkali metal silicate solution contains alkali metal hydroxide.

References Cited by the Examiner

UNITED STATES PATENTS

| | | | |
|---|---|---|---|
| 2,444,913 | 7/1948 | Bond | 252—457 X |
| 2,453,585 | 11/1948 | Payne et al. | 252—455 X |
| 2,472,830 | 6/1949 | Hunter | 252—451 |
| 2,634,241 | 4/1953 | Webb | 252—455 |
| 3,003,951 | 10/1961 | Winyall | 252—453 X |
| 3,015,620 | 1/1962 | Plank et al. | 252—452 X |

OSCAR R. VERTIZ, Primary Examiner.

JULIUS GREENWALD, MAURICE A. BRINDISI, BENJAMIN HENKIN, Examiners.

N. DAVIS, E. J. MEROS, Assistant Examiners.

UNITED STATES PATENT OFFICE
CERTIFICATE OF CORRECTION

Patent No. 3,264,227                                    August 2, 1966

Robert H. Cramer et al.

It is hereby certified that error appears in the above numbered patent requiring correction and that the said Letters Patent should read as corrected below.

Column 3, line 73, for "2.5 gms." read -- 3 grams --; column 4, line 12, for "2.5 grams" read -- 3.0 grams --; columns 9 and 10, TABLE 2, the lower part of the table should appear as shown below instead of as in the patent:

| Catalyst Yield | $\Delta^1$ | $\Delta^1$ | $\Delta^1$ |
|---|---|---|---|
| Conversion, % vol. | 46.8 --- | 52.7 --- | 44.2 --- |
| Gasoline, % vol. | 36.9+3.6 | 39.7+3.5 | 34.7+2.7 |
| Total $C_4$'s, % vol. | 11.7-2.8 | 15.3-1.7 | 12.5-0.9 |
| Dry Gas, % wt. | 4.8-1.1 | 5.9-1.0 | 4.0-1.6 |
| Coke, % wt. | 2.2-0.6 | 2.5-1.1 | 1.8-0.8 |
| Hydrogen, % wt. | 0.03-0.01 | 0.04-0.02 | 0.03-0.0 | columns 11 and 12, TABLE 3, under the heading Ex. 4, line 6 thereof, for "402" read -- 420 --; same table, lines 6 to 8 from the bottom, should appear as shown below instead of as in the patent:

| Conversion, % vol. | 56.6 | 57.9 | 57.5 |
|---|---|---|---|
| Gasoline ($C_4$-free), % vol. | $\Delta^1$ 42.8+5.1 | $\Delta^1$ 42.7+4.3 | $\Delta^1$ 43.9+5.6 |

| 55.8 | 44.6 | 55.6 | 52.5 | 52.4 | 50.7 |
|---|---|---|---|---|---|
| $\Delta^1$ 40.7+3.2 | $\Delta^1$ 36.0+3.8 | $\Delta^1$ 40.9+3.5 | $\Delta^1$ 39.7+3.5 | $\Delta^1$ 40.3+4.2 | $\Delta^1$ 39.6+4.1 | same TABLE 3, under the heading Ex. 3, line 4 from the bottom, for "7.5+0.2" read -- 7.6+0.2 --.

Signed and sealed this 5th day of September 1967.

(SEAL)
Attest:

ERNEST W. SWIDER
Attesting Officer

EDWARD J. BRENNER
Commissioner of Patents